Aug. 5, 1941.  H. VAN DER HOF  2,251,379
VEHICLE BRAKE MECHANISM
Filed March 12, 1938   2 Sheets-Sheet 1
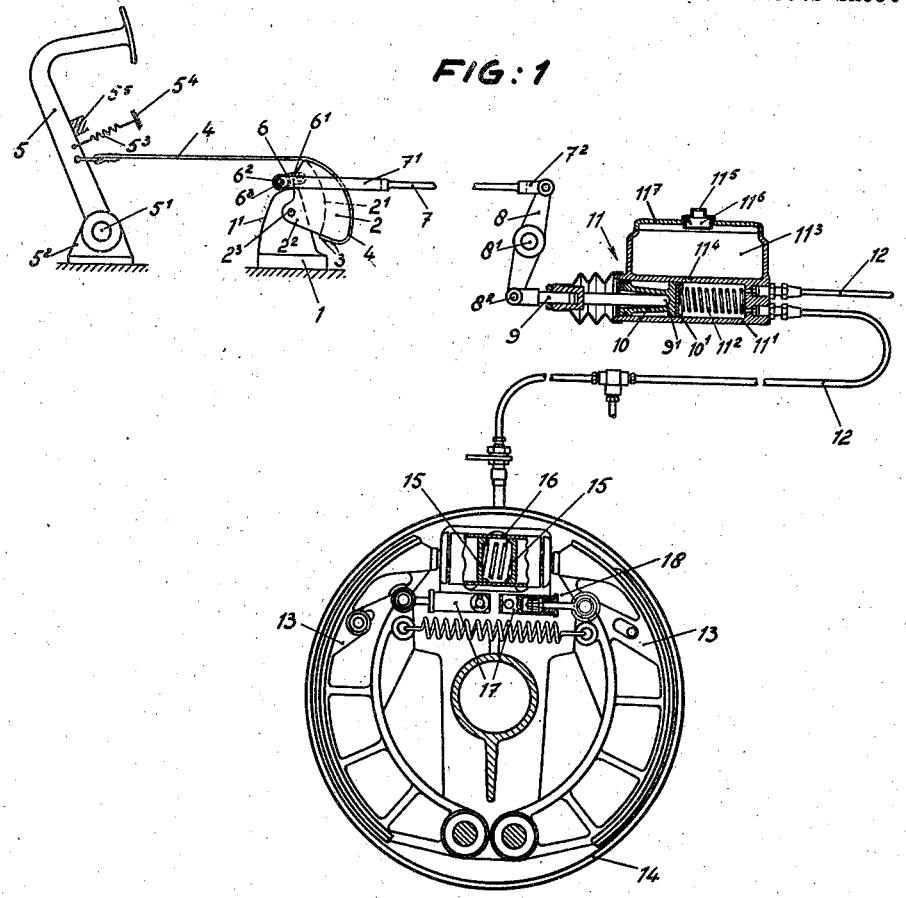
FIG:1
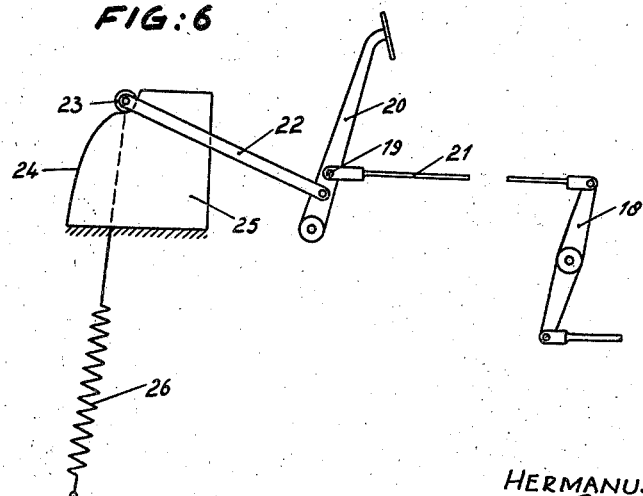
FIG:6
INVENTOR
HERMANUS VAN DER HOF
BY Richards & Geier
ATTORNEYS Aug. 5, 1941.                H. VAN DER HOF                2,251,379
                         VEHICLE BRAKE MECHANISM
                         Filed March 12, 1938            2 Sheets-Sheet 2
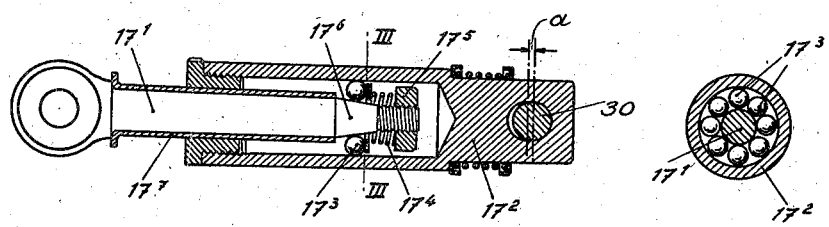
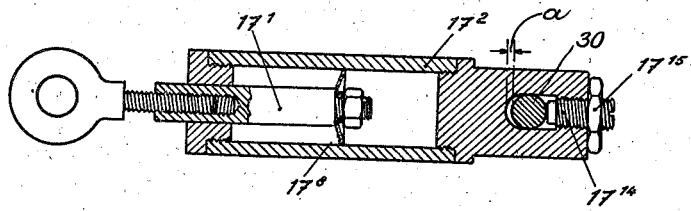
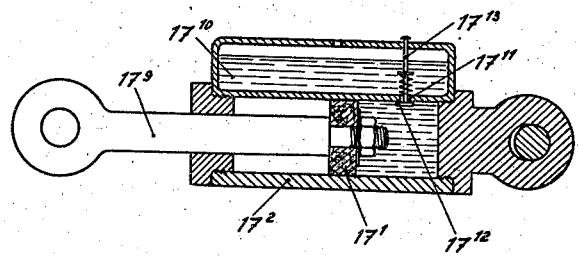
INVENTOR
HERMANUS VAN DER HOF
BY
ATTORNEYS Patented Aug. 5, 1941

2,251,379

UNITED STATES PATENT OFFICE 2,251,379

VEHICLE BRAKE MECHANISM

Hermanus van der Hof, Amsterdam, Netherlands

Application March 12, 1938, Serial No. 195,432
In Great Britain March 15, 1937

2 Claims. (Cl. 188—79.5)

The present invention relates to improvements in or relating to vehicle brake mechanism, particularly of the kind comprising individual brake means including a brake drum and shoes associated with each wheel in combination with transmission means for operating such brake means mechanically or hydraulically in the manner known per se.

In order to be able to utilize the available brake throw in the most effective manner that is to say in order to obtain the highest braking action with the smallest possible force, braking devices have been designed permitting of augmenting the transmission ratio. In the case of these known devices the transmission ratio increases, when the brakes are applied. Many ways have been proposed to effect such variation in the transmission ratio by mechanical or hydraulical means, e. g. a pump operating with differential pressure pistons.

However, the advantages of all such transmission ratio augmenting means can only be obtained in practice when the maximum distance to be traversed by the brake shoes is kept rigidly constant, i. e. when even the smallest wear of the brake lining is automatically compensated as only in that case one can be sure at all times of a sufficiently high transmission ratio at the end of the brake pedal throw to forcibly brake large masses with the relatively small force available. Particularly in the case of hydraulically operated vehicle brakes, even the smallest variation of the brake shoe clearance would result in a considerable enlargement of the necessary throw of the pedal or lever operating the liquid supply pump, since at this point all variations of the clearance accumulate, so that the available throw could not be used to its full extent to obtain the high transmission ratio rendered possible by the ratio augmenting means.

It has already been proposed to employ in combination with such transmission ratio augmenting means, such as a cam, automatically operating means for compensating the increase of the clearance due to wear of the brake shoes, i. e. for taking up the slack in the brake force transmitting members caused by such wear.

This measure, however, does not provide an adequate solution of the problem, as the brake shoes of the various wheels do not wear uniformly, whereas the degree of compensation of the slack in the brake force transmitting members is naturally determined by the brake shoe which has worn least, so that a uniform braking of all wheels with the maximum force obtainable with the transmission ratio augmenting means is not possible. Moreover in this prior proposition the adjustment of the slack in the transmission members is not strictly continuous, but stepwise, as for this adjustment pawl and ratchet devices are relied upon so that the maximum clearance of the brake shoes is not kept rigidly constant.

The present invention provides the true solution of the problem by employing in combination with the means for augmenting the transmission ratio, continuously operating brake adjusting means associated with each brake unit for keeping the maximum distance between each brake shoe and brake drum rigidly constant. Continuously operating brake adjusting means of this kind are known per se so that the invention is to be seen in the combination thereof with the said transmission ratio augmenting means, such combination for the first time enabling the advantages of such ratio augmenting means to be obtained to their full extent, by each position of the complete brake mechanism ensuring a fixed transmission ratio, corresponding to such position, between the applied force and the pressure exerted on the brake drum, the transmission ratio in such a position being permanent. As this is the case, the transmission ratio, by a suitable shaping of the augmenting means, may be made to vary in such a manner that the force is always equally high. In that case a considerable portion of the force to be exerted may be supplied by a spring, accumulating part of the energy liberated by the release of the brake members and supplying such energy to the brake operating members under the control of the augmenting means, upon application of the brake shoes, this being of considerable advantage as it increases the available energy for forcibly barking very large masses.

The invention will be hereinafter more fully described with reference to the accompanying drawings.

Fig. 1 is an elevational view of a brake unit embodying automatic adjusting members, showing at the same time on a somewhat smaller scale the liquid supply pump, the brake actuating pedal and transmission ratio augmenting means associated therewith. The Figs. 2–5 show different constructional embodiments of the automatic adjusting member as employed in a brake mechanism according to the invention.

Fig. 6 shows a modified form of the transmission ratio augmenting means embodying a spring.

Referring to Fig. 1 the transmission ratio augmenting means consists of a suitably shaped cam 1 secured to the vehicle frame and carrying a flat segmental element 2 partly hollowed as indicated by the dotted line $2^1$, to form fork members $2^2$ embracing the cam 1 from the rear, an axis $2^3$ traversing said fork members and said cam to pivotably connect said segmental element 2 to the cam 1.

To the lower edge of the segmental element 2 there is attached, as by screws 3, a flat flexible band 4, which follows the outer contour of the segmental element 2 and at its free end is pivotably attached to a brake pedal 5 pivoting about an axis $5^1$ of a bracket $5^2$ secured to the vehicle frame. The pedal 5 is under the action of a spring $5^3$ attached to a fixed part $5^4$ of the vehicle frame, such spring normally tending to draw the pedal 5 against a fixed stop $5^5$, in its elevated initial position.

Within the space between the opposite inner faces of the fork members $2^2$, above the top of the cam 1, lies the shank portion $6^1$ of an arcuate forked roller carrying member 6, a roller $6^2$ being mounted in such carrying member to freely rotate therein about an axis $6^3$, the roller $6^2$ engaging the suitably shaped cam face $1^1$ of the cam 1. The axis $6^3$ projects to both sides beyond the outer face of the roller carrying member 6 and is pivotably engaged by the forked end $7^1$ of a connecting rod 7, the opposite end $7^2$ of which is similarly connected to the upper end of a lever 8 pivoting about an axis $8^1$ mounted in the vehicle frame, the lower arm of the lever 8 being pivotably attached at $8^2$ to a pressure rod 9, the semi-spherical free end $9^1$ of which engages the correspondingly shaped bottom face of a cup-shaped plunger member 10 carrying a rubber or leather cuff $10^1$ and working in the cylinder $11^1$ of the usual liquid supply pump 11, against the action of a spring $11^2$ arranged within the cylinder $11^1$. The pump has a liquid supply reservoir $11^3$ communicating with the interior of the cylinder $11^1$ by an aperture $11^4$ and with the atmosphere through an opening $11^5$ in a filling cap $11^6$ screwed into the cover plate $11^7$ of the reservoir $11^3$.

From the bottom end of the cylinder $11^1$ pressure lines 12 lead to the various brake units of the vehicle, two of such connections being shown only, as from these, pipes are branched off at suitable points to lead to the remaining brake units not shown.

The brake unit shown in Figure 1 comprises in the ordinary manner two brake shoes 13, 13 adapted to be forced against the brake drum 14 by pistons 15, 15, connected to said brake shoes and oppositely arranged within a wheel cylinder 16 receiving liquid from the master cylinder $11^1$ of the supply pump 11 through the pressure line 12. Liquid is supplied to the wheel cylinder 16, upon depression of the brake pedal 5, through the transmission ratio augmenting means. Upon depressing the pedal 5 the segmental element 2 under the influence of the flexible band 4 is pivoted about the axis $2^3$ of the cam 1 thereby exerting a traction force upon the connecting rod 7 through the medium of the fork member 6 and the axis $6^3$, at the same time causing the roller $6^2$ to travel along the cam face $1^1$ of the cam 1. The force exerted on the connecting rod 7 causes, through the medium of the lever 8, the pressure rod 9 to force the plunger 10 towards the right (in Fig. 1) of the cylinder, against the action of the spring $11^2$ thereby closing the aperture $11^4$ and thus forcing the liquid contents of the cylinder into the pressure line 12 leading to the wheel cylinder 16. The contour of the cam face $1^1$ is so designed that the transmission ratio of the force exerted on the brake pedal increases as the application of the brakes proceeds, as will be readily understood.

The self locking brake adjusting member 17 associated with each brake shoe 13 is pivotably mounted on the backing plate 18 of the brake unit and with a predetermined clearance $a$ (Figure 2) is pivotably connected to the brake shoe 13. This clearance $a$, corresponding to the maximum distance between the braking faces lies in the direction in which the adjusting member functions and remains in this direction unconsidered the degree of wear of the braking surfaces.

According to one embodiment of such adjusting member (Figures 2 and 3), the same comprises two parts $17^1$ and $17^2$ arranged one within the other and capable of free relative movement in one direction only. In the opposite direction the two parts are coupled in a self locking manner by the provision of elements such as balls $17^3$, which by a spring $17^4$, resting against an abutment $17^5$ moving with the inner part $17^1$, are forced into the annular narrowing space formed between the cylindrical inner wall of the outer part $17^2$ and a conical portion $17^6$ near the inner end of the part $17^1$. As the balls $17^3$ are permanently kept in contact with both the inner wall of the outer part $17^2$ and the outer face of the cone $17^6$, any relative displacement of the parts $17^1$ and $17^2$, even the smallest, in a direction to shorten the overall length of the adjusting member will be impossible, whereas free relative movement in an opposite direction is always possible.

If, in applying the brakes the braking surfaces are brought into contact with one another the clearance $a$ (e. g. 1 mm.) has gone to the left of the pin 30, i. e. as shown in the drawing. The pin 30 is in contact with the right hand side of the aperture, but does not exert a tractive force on the adjusting member. On the least wear of the braking surfaces, however, the adjusting member is extended. Upon release of the applied braking force the brake shoe is permitted to swing back about its anchor pin until the clearance $a$ has again moved to the right hand side of the connecting pin 30, or in other words the clearance between the braking surfaces, in spite of the wear thereof, will be the same as before. This, in combination with the provision of means for admitting or introducing additional liquid into the fluid actuation system, such as the provision of the opening $11^4$ in the wall of the master cylinder $11^1$ communicating with the liquid supply reservoir $11^3$ and governed by the master cylinder plunger 10 (Figure 1) ensures the brake pedal always starting from the same starting position.

Upon replacement of worn brake facings it becomes necessary to return the adjusting members to their original length. To enable this, means may be provided operable from without to render the one-way coupling of the two parts of the adjusting member inoperative. In the embodiment shown in Figure 3 such means comprises a sleeve $17^7$ surrounding the inner part $17^1$ so that by pushing such sleeve inwardly the balls $17^3$ may be forced back against the action of the spring $17^4$ thereby enabling the part $17^1$ to be returned into its initial position within the part $17^2$. Upon releasing the sleeve $17^7$ the spring $17^4$ again forces the balls $17^3$ into contact with the parts $17^2$ and $17^6$.

Figure 4 shows an alternative embodiment of the brake adjusting means. In this case the self-locking one-way coupling means comprises a preferably sharp-edged locking element or elements, in the form of a steel disc $17^8$ secured to the inner part $17^1$ of the two-part adjusting member and placed under initial stress within the cylindrical outer part $17^2$ in such a manner, that the edge of the disc $17^8$ presses against the inner wall of said outer part at an acute angle thereby enabling the disc to slide freely along such inner wall in one direction and causing it to force itself against or into said wall upon movement in the opposite direction, to prevent any relative movement of the parts $17^1$, $17^2$ of the adjusting member in this latter direction. To enable the adjusting member to be returned to its original length, the inner part $17^1$ is preferably formed as shown, of two sections the one threaded into the other enabling the total length of the adjusting member to be reduced to its initial value by screwing the two sections farther into one another.

Figure 5 shows a further alternative, in which the self-locking one-way coupling is constituted by a liquid contained in a cylinder $17^2$ forming the outer part of the adjusting member the inner part of which is formed by a piston $17^1$ and rod $17^9$. The portion of the cylinder containing the liquid is connected with a liquid supply reservoir $17^{10}$ by a hole $17^{11}$ governed by a nonreturn valve $17^{12}$ opening in the direction of the cylinder. It will be readily understood, that upon movement of the piston in one direction (to the left in Figure 5) causes the valve $17^{12}$ to be opened inwardly and an additional quantity of liquid to be drawn into the cylinder, preventing any movement of the piston $17^1$ in opposite direction as the liquid is incompressible and the nonreturn valve $17^{12}$ prevents back flow of the liquid.

To enable the adjusting member to be returned to its initial length, the stem $17^{13}$ of the nonreturn valve $17^{12}$ may be passed through the wall of the reservoir $17^{10}$ so that the valve may be kept open from without during inward movement of the piston, allowing the excess of liquid to flow back into the reservoir.

As there is the possibility, that the adjusting member may be manufactured without the value of the clearance between lining and brake drum of the particular vehicle on which the adjusting member will eventually be mounted, being known, it may be advantageous to render the clearance $a$ variable by means of an adjusting screw $17^{14}$ and nut $17^{15}$ as e. g. is illustrated in the embodiment shown in Figure 5. It will be understood that the other embodiments may of course also be provided with means for varying the clearance $a$.

In the modified form of the transmission ratio augmenting means, shown in Figure 6, 18 represents the lever operating the pump. The lever 18 is connected at 19 to the brake pedal 20 through the medium of a link 21, such brake pedal carrying a pivotable link 22 having at its free end a roller 23 rotatably mounted thereon, this roller being constrained to move along the face 24 of a fixed cam 25 of suitable design to vary the transmission ratio in a manner to keep the force to be supplied of uniform strength. According to the invention, the work to be performed at the point of articulation of the link 21 with the lever 18 is partly supplied by a spring 26, (which may be either a tension or a compression spring), acting upon the roller 23. When applying the brakes, the roller 23 initially is only permitted a small displacement in the direction of the spring tension and therefore the spring supplies little energy only. Towards the end of the brake throw the displacement of the roller 23 in the direction of the spring tension increases (that is to say the transmission ratio grows) and the spring supplies more energy. In releasing the brakes, the energy accumulated therein is liberated and for the greater part is taken up by the spring 26 to be again supplied to the roller 23 when applying the brakes. With this device either the operating member, e. g. the foot, has to supply less energy, i. e. the brakes may be applied with less force or larger masses may be braked with the same force. The spring 26 in a sense constitutes a servo-device, in which the servo-energy is supplied once in loading the spring 26, so that this quantity of energy is alternately in the spring 26 or in the brakes.

The energy accumulated in the servo spring 26 to be used at the next braking operation is that taken up by the elastic deformation of the brake mechanism during the actual braking action; this energy is supplied by the brake mechanism itself and not by the brake release springs.

What I claim is:

1. In a hydraulic brake system for vehicles and the like having an operator-actuated member, a brake drum having a plurality of internal pivotally mounted brake shoes, a fluid brake cylinder to actuate said shoes into contact with the interior periphery of said brake drum, a central reservoir and pump, a fluid connection from said pump to said brake cylinder and operating connections between said actuated member and said pump including a device for increasing the force ratio upon actuation of said member by the operator, continuously operating automatically controlled compensating means for each brake shoe for maintaining the lost motion of the pump piston constant, mounted between the brake shoe and the backing plate, comprising a thrust member slidable within a cylinder, a sharp edged resilient disk like blocking element mounted on said thrust member, said resilient disk being adapted to move freely with said thrust member along the inner wall of said cylinder in one direction, but in the opposite direction forcing itself into said wall to prevent movement of said thrust member relatively to said cylinder.

2. In a hydraulic brake system for vehicles and the like having an operator-actuated member, a brake drum having a plurality of internal pivotally mounted brake shoes, a fluid brake cylinder to actuate said shoes into contact with the interior periphery of said brake drum, a central reservoir and pump, a fluid connection from said pump to said brake cylinder, operating connections between said actuated member and said pump including a device for increasing the force ratio upon actuation of said member by the operator, continuously operating automatically controlled compensating means for each brake shoe for maintaining the lost motion of the pump piston rigidly constant, and a spring member, so connected into the brake system as to be able to accumulate therein most of the energy liberated upon release of the brakes, and, upon again applying the brakes, to transmit such energy to the brakes through the device for increasing the force ratio.

HERMANUS VAN DER HOF.